(12) United States Patent
Peerbhai (10) Patent No.: US 11,658,937 B2
(45) Date of Patent: May 23, 2023

(54) METHOD AND APPARATUS OF CONTROL FOR ROBOTIC SWARMS

(71) Applicant: Imran Hasan Peerbhai, Kirkland, WA (US)

(72) Inventor: Imran Hasan Peerbhai, Kirkland, WA (US)

( * ) Notice: Subject to any disclaimer, the term of this patent is extended or adjusted under 35 U.S.C. 154(b) by 332 days.

(21) Appl. No.: 17/075,649

(22) Filed: Oct. 20, 2020

(65) Prior Publication Data

US 2022/0118622 A1  Apr. 21, 2022

(51) Int. Cl.
*H04L 61/5007* (2022.01)
*H04L 67/02* (2022.01)

(52) U.S. Cl.
CPC .......... *H04L 61/5007* (2022.05); *H04L 67/02* (2013.01)

(58) Field of Classification Search
CPC ..... H04L 61/5007; H04L 67/02; H04L 67/12; H04L 67/52; H04L 67/10; H04L 61/45
USPC ......................................................... 455/344
See application file for complete search history.

(56) References Cited

U.S. PATENT DOCUMENTS 10,042,787 B2 * 8/2018 Kawahito ........... G06F 13/1673
2019/0121553 A1 * 4/2019 Himelstein ........... G06F 15/167

* cited by examiner

*Primary Examiner* — Don N Vo (57) ABSTRACT

A method, system, and/or computer program product controls movements and adjusts operations of a robot or collection of robots over a computer network. The system allows for the dynamic creation of cloud message queues, and uses a hierarchical message format and weight matrix collapse method to allow multi-entity deconfliction of control messages so that multiple operators, either human or intelligent software agents, may simultaneously control one or more robots or subassemblies of robots and/or other electronic/mechatronic devices.

9 Claims, 5 Drawing Sheets

METHOD AND APPARATUS OF CONTROL FOR ROBOTIC SWARMS

CROSS-REFERENCE TO RELATED APPLICATION

This application claims the benefit of priority of U.S. provisional application No. 62/923,576, filed 20 Oct. 2019, the contents of which are herein incorporated by reference.

BACKGROUND OF THE INVENTION

The present invention relates to autonomous robots and, more particularly, a method and apparatus of control for robotic swarms.

A number of applications require that large numbers of autonomous robotic units, which may be referred to as swarms or swarming systems, be controlled. Existing systems have tended towards homogenous swarms consisting of copies of an individual device working in tandem to accomplish tasks. As just one of many possible examples, a swarm of flying robotic drones with lights attached can be used to perform an entertainment task by creating images in air. However, examples of heterogenous swarms, consisting of different types of autonomous robotic units, do also exist.

The open source Robot Operating System (ROS™) defines a robot as a series of software processes running on the physical hardware of a robot with sensors and actuators, messaging to/with a single central core process that manages name resolution, and inter-process communications via a publication/subscription model. This core process is embodied on a computer that is either physically built into the robot or connected by networked communication systems. Independent software processes, called nodes, manage individual components, such as sensors or motors, and then interact with each other via the core process to send and receive messages. In existing implementations, a secondary system then manages inter-robot communication via a bridge process, embodied as a ROS® node, to create a swarm of robots, with the swarm managed by a swarm control system. An example of this design is a product known as "Drone Dance Controller"® by UgCS Corporation.

It would be desirable to enable multiple core processes, potentially running in on-demand virtualized containers over much longer distances, to distribute, prioritize, and consolidate control inputs and state outputs for multiple robotic systems from multiple sources. This would allow multiple agents to control/view multiple robots, one agent to control/view many robots, many agents to control/view subassemblies of a single robot, or one robot to distribute state information such as a video stream to many agents, dynamically. Such a system is described herein.

TECHNICAL FIELD

The present disclosure is directed to robotic swarm systems, and more particularly, to control systems for such having multiple simultaneous operators, both human or software intelligent agents inclusively, in a dynamic and hierarchical control configuration.

A robotic swarm is a collection of one or more computer-controlled electronic or electromechanical devices, operating to, either sequentially or in parallel, perform actions. Each device, individually, can be called a robot. These devices may operate in a multitude of environments, such as land, sea, air, or other environments. These devices may be autonomous, but must accept control input of some sort, such as navigational waypoints, sensor weight settings, actuator motion, or other possible inputs. These devices may be of similar, or radically different designs. A non-exhaustive example of such a system is a land-based robotic arm that may interact with a satellite orbiting the planet to perform an action with coordination controlled by a swarm control process. These devices may be mounted to or carried by another device, such that each device has its own independent control computer or communication system. Such swarm control systems do not require multiple copies of any entity to be present, but support multiple entities if they should be present.

A dynamic control configuration is a control configuration with elements that have transient existence, scope, or impact to the overall system under control. A system may be active and under control of an existing set of agents, and a single agent's control authority may be instanced or destroyed and enter or exit the control stack of the already active system. For example, a human being starting a new control process and adding control inputs to an existing autonomous fleet, while the system is actively performing a task.

A hierarchical control configuration is one where different control agents may assume different priority levels in control to handle control input conflict resolution. The higher priority level input overrides conflicting control from a lower priority agent. This priority may be scoped either statically or dynamically. Agents at the same priority level resolve conflicts through a matrix collapse, either with or without an intermediary factor matrix transformation, depending on the type of control.

SUMMARY OF THE INVENTION

In one aspect of the present invention, a method of encoding and deconflicting control information to adjust operations of robotic systems that enables one or more operators be dynamically assigned, the computer-implemented method includes the following: configuring a discovery system operatively associating one or more cloud cores, one or more controllers, and a plurality of robots; providing a hierarchal message format system comprising at least three layers of message composition; encoding for message generation time, message dispatch time, message origin, sender global position, operating state of either normal or exception, and control inputs; distributing message delivery and partial deconfliction between the one or more controllers, the plurality of cloud cores, in either public or private cloud infrastructure, and on-robot computers over a network; resolving on-robot conflicts for control inputs generated by the one or more controllers not already deconflicted in each cloud core; and stopping a robot of the plurality of robots if no control inputs are received for said robot after a timeout interval.

In another aspect of the present invention, the above method includes the following: discovering the plurality of robot, the plurality of core(s), and/or controllers(s) via Representational State Transfer (REST) application programming interfaces (APIs), wherein said APIs implement routes to perform functions including: (1) a route for storing identification information including globally unique name and/or IP address of a robot, core, or controller process by name, type, and/or IP address; (2) a route for remote message queue/core allocation and enabling access via network communication; (3) a route for enabling a robot, core, or controller process to request identity, IP, and/or geographic location of any other robot, core, or controller; (4)

a route for querying previously stored name information by IP address, either inferred by an HTTP or HTTPS request, or directly supplied as a parameter; (5) a route to destroy and disconnect cloud infrastructure used to manage message queues also known as core(s); and (6) a route to assign priority of a specific controller; and further including: a first message format used to specify actions, called an action message comprising action types of identify, subscribe, unsubscribe, publish, request, or response; and a second message format comprising fields for storing/accessing message action type, the globally unique name of the message sender, a Boolean indicator that control information is present in the composited payload message; and a payload message type that includes the following: (1) message meta data which includes information including the globally unique name of the sender, a topic string for the core to use in creating maps of messages for delivery, a creation time as a Portable Operating System Interface Coordinated Universal Time (POSIX UTC) time, a delivery time which is also a POSIX UTC time, a Boolean field indicating the message has been dispatched to a receiver, and an exclusion list indicating which devices should not be given the message; and (2) a serialized byte array indicating the payload of the message; a message requirement exportable via the serialized byte array of a payload message that such messages must implement a "Serializable" interface containing a "ToBytes" function that returns a byte array, and a "From Bytes" function that take a byte array and return a message of the original data type, or other similar transformation defined by programming language specifications for communicating required conversions; a control position message configured to implement the "Serializable" interface to enable transport within a payload message including the following: (1) an array of floating-point, either single or double precision, control inputs for a robot, with index 0 of the array indicating origination information of the message, with a value of 0.0 indicating the message originated on the robot itself, and 1.0 indicating the message originated in another location, and index 1 of the array indicating if this message is normal operations with a value of 0.0 indicating normal operation and a value of 1.0 indicating exception operation conditions, wherein all other elements of the array indicate control input for a robot; (2) a priority field, which is a 32-bit unsigned integer between 0 and 4,294,967,295. Values between 0 and 99, inclusively, indicate control inputs generated by either human or non-human mechanisms, and values greater than or equal to 100 exclusively indicate human operators; and (3) a position field or fields indicating the latitude, longitude, and elevation of the message generator. This field will have a latitude, longitude, and elevation of 0.0, 0.0, and 0.0 when position is not ascertainable or estimable; and further including: distributing robot state information or control information via a network-connected core with or without partial control message deconfliction, as follows: (1) the queue receives action messages; (2) the queue responds to publish action messages by adding the message for delivery by utilizing the topic information contained within the message; (3) the core responds to subscribe messages by storing a list of recipients for each topic; (4) the core may respond to identity messages by returning the name of the caller by IP address; (5) the core may respond to request actions by examining the payload of the message for parameters, performing an algorithm utilizing those parameters, then issuing a "response" action message with the output of the requested algorithm; (6) the core may detect the presence of control messages via a control presence Boolean, and performs queue deconfliction action via comparison of the new message with the most recent action message with a "true" control present Boolean value already in the appropriate publishing queue; and (7) publishing messages from the queue to subscribed targets on a regular time interval; and further including: distributing network-connected message delivery infrastructure such that at least the following conditions are satisfied: (1) all robots must have exactly one "low data" core dedicated to control inputs. These low data cores are not allowed large messages, that is messages with more than 10 kilobytes of payload information; and (2) control message queue deconfliction over a time interval is performed in this "low data" core prior to control queue delivery to a robot or other subscriber; and further including:

providing mechanism for core control deconfliction utilizing the control array received in an action message such the following conditions are met: (1) normal off-robot operator control information takes priority over normal robot self-generated inputs; (2) exception on-robot control inputs take priority over normal off-robot control inputs; and (3) exception off-robot control inputs take priority over exception on-robot control inputs; and further including a mechanism for multiple control input collapse into a single control input array via the following matrix transformations: (1) the first two elements of each control input array received via messages are dropped; (2) each control array is converted into a column vector; (3) any column vector elements not present in column vectors with shorter lengths than the longest have an element value of 0.0; (4) each control column vector is concatenated, in any order, into a control matrix with final matrix size equal to the number of conflicting messages received by the length of the longest column vector; (5) the generation of a weight matrix, such that the size of the weight matrix is equal to the size of the control matrix, with every weight element set to an initial condition of 1.0; (6) the computation of new weights by row, via functions utilizing control matrix row vectors as input and outputting a row vector to replace the corresponding row vector in the weight matrix; (7) matrix multiplication of the weight matrix with the control matrix to generate a weighted control matrix; (8) horizontal collapse of both the weighted control matrix and weight matrix via row summation to two independent column vectors; (9) elementwise division of the weighted control column vector by the weight column vector; and (10) conversion of the resultant column vector back to an input array appropriate to the robot; and further including generating message generation time, message receipt time, message origination location, or linear transformation via factor conversion as follows: (1) only one factor transformation may be performed per row vector of the weight matrix; (2) allowed factor functions may use the corresponding control matrix row as input; (3) the factor function returns a row vector, which replaces the row vector of the weight matrix via corresponding row index; (4) the factor functions may be a 1-hot style minimization or maximization function, such that the value 1.0 is returned for the element with either the minimal or maximal value of the control row vector, with all other elements being 0.0; and (5) the factor functions may be a simple linear transformation of the form y=mx+b, where y is the output weight element, m is a constant specified via configuration, x is the corresponding control element, and b is a constant specified via configuration. This same function may be performed with the row vectors directly, in which case, the corresponding formula would be Y=MX+B, where Y, M, X, and B are corresponding row vectors, and all operations are performed element-wise, wherein a program code is provided and executed as a service in a cloud environment, wherein a program code is dynamically provided and executed as a service in a cloud environment.

In yet another aspect of the present invention, a system of encoding and deconflicting control information to adjust operations of robotic systems that enables one or more operators be dynamically assigned, the computer-implemented method comprising: a discovery system operatively associating one or more cloud cores, one or more controllers, and a plurality of robots; a hierarchal message format system comprising at least three layers of message composition; a computer program product for message generation time, message dispatch time, message origin, sender global position, operating state of either normal or exception, and control inputs; a mechanism configured for distributing message delivery and partial deconfliction between the one or more controllers, the plurality of cloud cores, in either public or private cloud infrastructure, and on-robot computers over a network; a mechanism configured for resolving on-robot conflicts for control inputs generated by the one or more controllers not already deconflicted in each cloud core; and a mechanism configured for stopping a robot of the plurality of robots if no control inputs are received for said robot after a timeout interval, wherein a computer program product to control or influence a robot, electronic, or mechatronic device, implementing all or parts of the above, wherein the program code is provided and executed on computer hardware, field programmable gate array, application specific integrated circuit, or other execution means physically present within the device, wherein a set of computer program products are provided to operate simultaneously to provide control of one or more devices by one or more intelligent, either human or non-human, operators, and where a system of computer programs are configured so that messages are transferred over a network using the above-defined message format.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

In the present disclosure, the individual electronic or mechatronic device entities are referred to as either a "robot" or "robots" while the group of robots acting together is referred to as a "robotic swarm". Intelligent agents, with non-exhaustive examples such as human beings, computer programs using either traditional or non-traditional machine learning techniques, combinations of software programs and execution hardware, execution hardware with mutable learnable elements, or any combination thereof, or equivalent units, are referred to as "controllers", "control agents", or "operators". Communications systems and remote compute infrastructure, including computing devices in remote data centers executing computer programs that utilize a variety of network-dependent processes, or computing programs that use the hypertext transport protocol, telecommunications or internet protocol networks (TCP/IP), software programs that utilize TCP/IP to share data, servers, data communications systems, radio data transceivers, the Internet, or any other device, being, entity, or object that can carry information between compute capable systems or perform remote computation, or any combination thereof, is referred to as "the cloud", "cloud computing", "remote data center", "cloud", or other appropriate synonym known to any person skilled in the relevant art. The combination of robots, operators, and the cloud is referred to as a "swarm system", "swarm", or "system". These terms are intended to facilitate communication of the disclosure, and are not intended to reference a specific implementation of the disclosure.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures or components associated with robots, swarms, computer networking, wireless communication systems, control input, or state representation, have not been shown or described in order to avoid unnecessarily obscuring description of the implementations. Other instances may use specific examples of mechatronic devices that once had a purely mechanical implementation in the past, but have been modified via computerization to become robots, such as autonomous cars.

Reference throughout this description to "one implementation" or "an implementation" means that a particular feature, structure, or characteristic described in connection with the implementation is included in at least one implementation. Thus, the appearance of the phrases, "in one implementation" or "in an implementation" in various places throughout the specification are not necessarily all referring to the same implementation. Furthermore, the particular features, structures, or characteristics may be combined in any suitable manner in one or more implementations.

The present disclosure may be a system, a method, and/or a computer program product. The computer program may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, a semiconductor storage device, or any suitable combination of the foregoing. A non-exhaustive list of more specific examples of the computer readable storage medium includes the following: a portable computer diskette, a hard disk, a ram access memory (RAM), a read-only memory (ROM), an erasable programmable read-only memory (EPROM, Flash memory, MultiMediaCard, or solid state disk), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide, or other transmission media (e.g. light pulses passing through a fiber optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C#, C++, Go, Python, GDScript, JavaScript, or the like, and conventional procedural programming languages, such as the "C" programming language or similar programming languages. The computer readable program instructions may execute entirely on robots, the operators' computers, smartphones, game consoles, or partly on the robots, and/or operators' computers, as a stand-alone software package, and/or partly on the robots, operators' computers, and partly on remote computers or entirely on remote computers or servers, with a non-exhaustive list including cloud servers, virtual servers, cloud containers, or other similar remote compute environments. In the latter scenario, the remote computers may be connected to robots and/or the operators' computers through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The methods, algorithms, and systems presented herein are not inherently related to any particular computer, processor, or other apparatus. Various general-purpose systems may be used with different computer programs in accordance with the teachings herein. Any of the methods, systems, and algorithms described in the present disclosure may be implemented in hard-wired circuitry, by programming a general-purpose processor, a graphics processor, a field programmable gate array, an application specific integrated circuit, or by any combination of hardware and software.

The present disclosure is intended to be applicable, in principle, to any system with an arbitrary number of mechatronic devices, compute capable devices, human beings, computer networks, data communications systems, intelligent software agents, or any combinations thereof in general. However, the representative embodiments described and illustrated herein will be directed to exemplary uses in autonomous vehicles and humanoid robots. It is to be further understood that the present disclosed implementations are intended to be used with all form of electronic or mechatronic devices with any number or sort of sensor or actuator including, without limitation, central motor system with mechanical shaft power distribution as well as all forms of actuation including multiple, distributed actuators.

Figure 1:
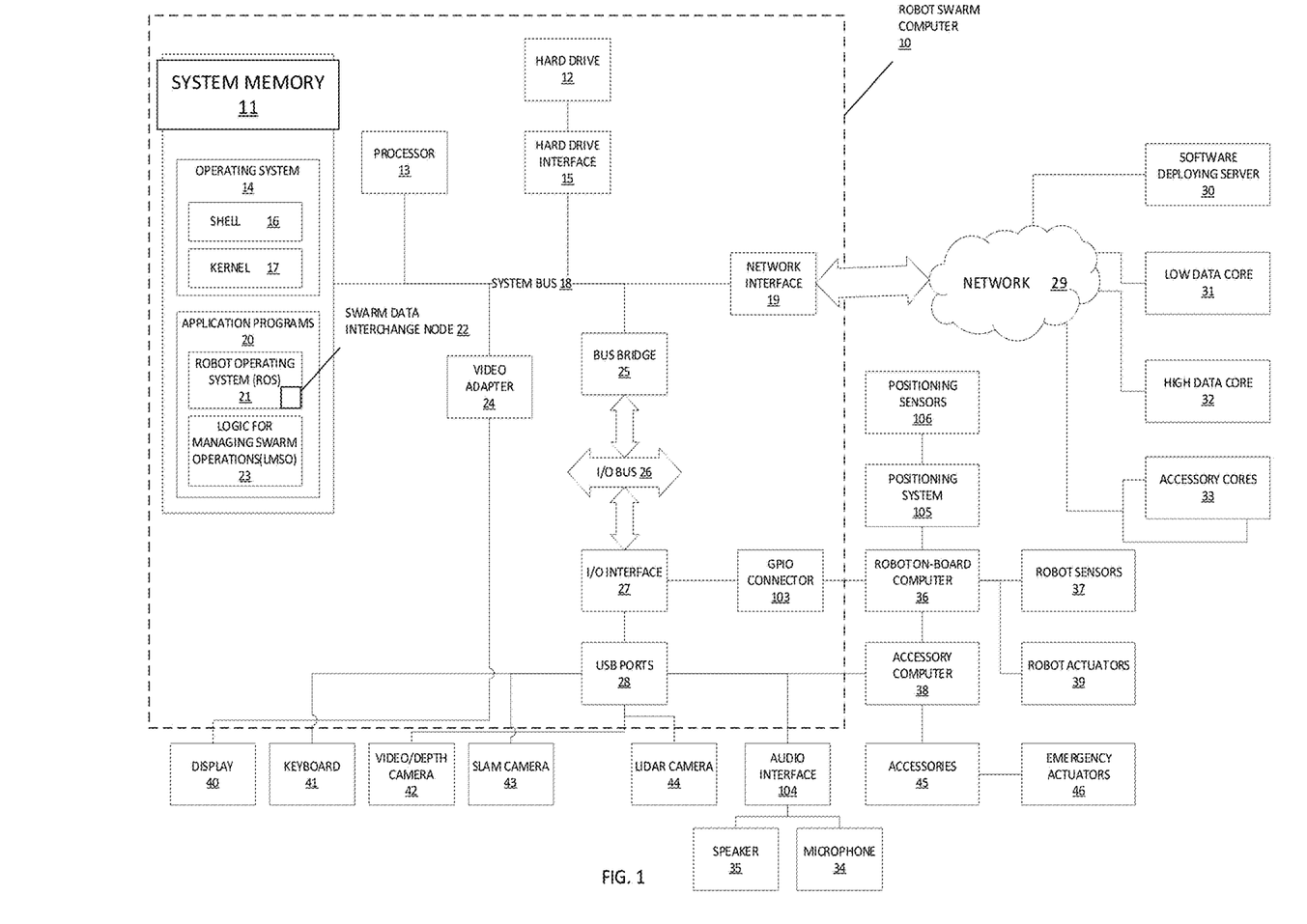
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 10 may be utilized by robot on-board computer 36 and/or accessory computer 38 shown in FIG. 1, and/or robot on-board computer 47 shown in FIG. 2, and/or swarm computer 80 shown in FIG. 4, and/or vehicle computer 84 shown in FIG. 4.

Exemplary computer 10 depicted in FIG. 1 includes a processor 13 that is coupled to a system bus 18. Processor 13 may utilize one or more processor cores. A video adapter 24, which supports a display 40, is also coupled to system bus 18. System bus 18 is coupled via bus bridge 25 to an input/output (I/O) bus 26. I/O interface 27 affords communication with various I/O devices, either via universal serial bus (USB) ports 28, or via other connectors known to those skilled in the arts of computer architecture, including a keyboard 41, a video/depth camera 42 (i.e., a digital camera capable of capturing still or moving images, with the optional feature of capturing depth information), a simultaneous location and mapping camera 43 (SLAM camera), a laser imaging, detection, and ranging (LIDAR) camera 44, an audio interface 104, an accessory computer 38, and the robot on-board computer 36. This enumeration of connected I/O devices is not intended to be exhaustive, nor is the exemplary method of connection in FIG. 1 meant to exclusively describe connection methods for the disclosure. One skilled in the relevant art will recognize that implementations may be practiced without one or more of these I/O components, with substitute components, or with functionally equivalent methods of connection, such as direct wiring to the I/O bus, local I/O wireless communication over protocols such as Bluetooth®, or via other I/O port methods.

Coupled to I/O interface 27 via GPIO connector 103 is a robot control computer 36 and an accessory computer 38. These computers may be of similar construction as exemplary computer 10, or may differ in myriad ways, such as in terms of I/O connectors, physical size, data storage media, processor type, or via other means. One skilled in the relevant art will recognize that implementations may be practiced without one or both of these computers, connections via other means such as USB or Bluetooth®, or with substitute computational devices such as field programmable gate arrays, application specific integrated circuits, or modifications within computer 10 such as the addition of one or more programmable real-time units.

Also coupled to I/O interface 27 via USB port 28 and robot computer 36 is positioning system 105 in FIG. 1. One skilled in the relevant art will recognize that implementations may be practiced without this positioning system, that the positioning system may be the same or different instance as positioning system 50 in FIG. 2, may be connected via other means other than via the robot computer, such as directly to the USB port 28 in FIG. 1, to the accessory computer 38 in FIG. 1, or connected via other means. The positioning system determines the position of computer 10 in FIG. 1 and/or other devices using positioning sensors 106. Positioning sensors 106 may be any type of sensors that are able to determine the position of a device, including computer 10, a robot 47 shown in FIG. 2, etc. Positioning sensors 106 may utilize, without limitation, satellite-based positioning devices (e.g., global positioning system—GPS based devices), accelerometers (to measure inertial changes), barometers (to measure changes in altitude), compasses (to measure changes in magnetic heading), etc.

A hard drive interface 15 is also coupled to system bus 18. Hard drive interface 15 interfaces with hard drive 12. In one embodiment, hard drive 12 populates a system memory 11, which is also coupled to system bus 18. System memory is defined as a lowest level of volatile memory in computer 10. This volatile memory includes additional higher levels of volatile memory which is not shown, including, but not limited to, cache memory, registers, and buffers. Data that populates system memory 11 includes computer 10's operating system (OS) 14 and application programs 20.

OS 14 includes a shell 16, for providing transparent user access to resources such as application programs 20. Generally, shell 16 is a program that provides an interpreter and an interface between the user and the operating system. More specifically, shell 16 executes commands that are entered into a command line interface or from a file. Thus, shell 16, also called a command processor, is generally the highest level of the operating system software hierarchy and serves as a command interpreter. The shell provides a system prompt, interprets commands entered by the keyboard, mouse, network, or other input media, and sends the interpreted command(s) to the appropriate lower levels of the operating system (e.g., a kernel 17) for processing. While shell 16 is a text-based, line-oriented user interface, the present invention will equally well support other user interface modes, such as graphical, voice, gestural, gamepads, etc.

As depicted, OS 14 also includes kernel 17, which includes lower levels of functionality for OS 14, including providing essential services required by other parts of OS 14 and application programs 20, including memory management, process and task management, disk management, mouse, keyboard, display, and network management.

Figure 2:
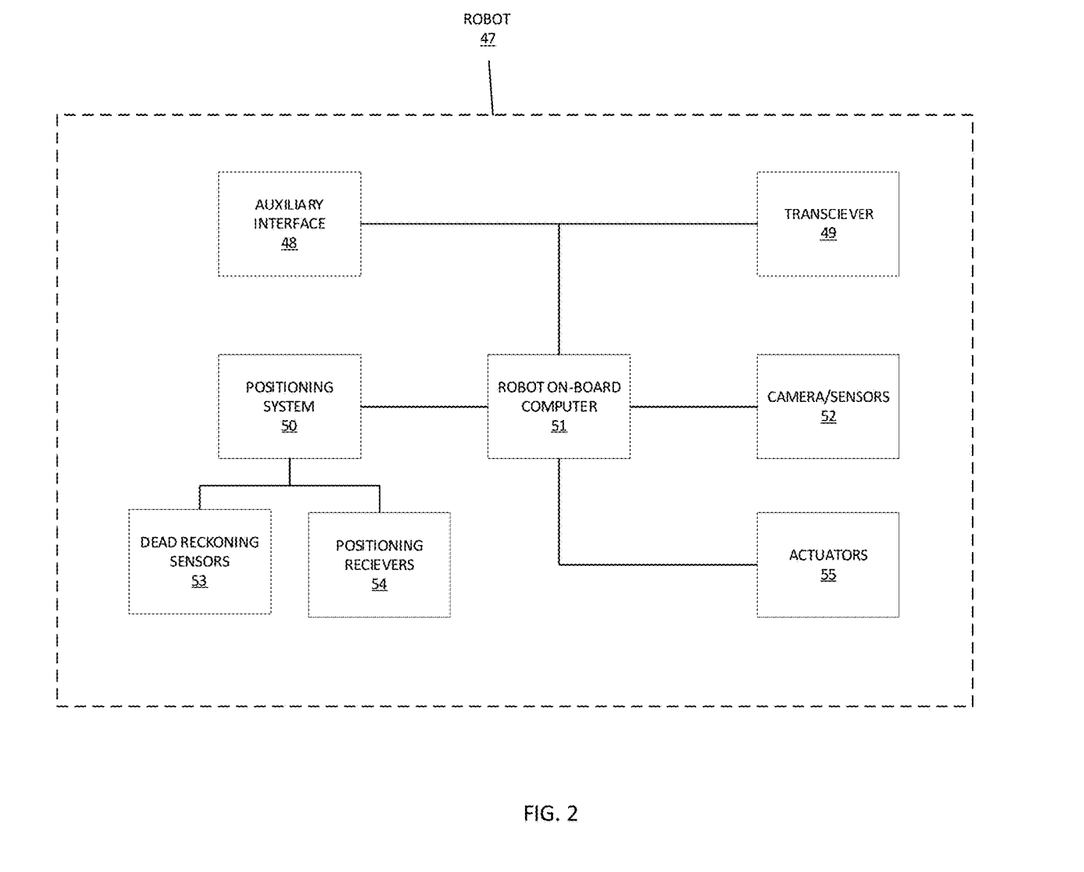
FIG. 2 illustrates control hardware and other hardware features of an exemplary robot in accordance with one or more embodiments of the present invention.

Application programs 20 includes the optional robot operating system (ROS™) 21 component, which may be used to provide services to access sensors, actuators, positioning systems, position, path or motion planning services, or to accommodate other hardware or software components in use by robot 47 in FIG. 2. ROS™ is property of Open Source Robotics Foundation (OSRF) and pre-exists this invention. One embodiment includes a swarm data interchange node 22. This node is a component of this disclosure, and comprises a software process implementing the ROS™ node protocol to provide interchange and translation services between ROS™ processes and the logic for managing swarm operations (LMSO) 23. One or more embodiments of this disclosure do not utilize ROS™ 21 or the swarm data interchange node 22. In those embodiments, the services provided by ROS™ 21 are provided by algorithms and methods implemented within the LMSO 23, or within the various core processes enumerated as items 31, 32, and 33 within FIG. 1. One skilled in the relevant art will recognize that implementations may be practiced without ROS™, or with substitutes for ROS™, including but not limited to ROS2™, Gobot®, AWS Greengrass™, or other similar frameworks. In cases where ROS™ 21 is substituted with another framework, the swarm data interchange node 22 will need to be re-implemented using appropriate techniques for the substituting framework in order to provide interchange services with the LMSO 23. The LMSO 23 includes code for implementing the processes described below, including those described in FIGS. 2-5.

As depicted, computer 10 is able to communicate with a software deploying server 30, which may also be called a discovery service, and/or other devices/systems (e.g. cloud core processes) using a network interface 19. Network interface 19 is a hardware network interface, such as a network interface card (NIC), etc. Network 29 may be an external network such as the Internet, or an internal network such as an Ethernet or virtual private network (VPN). In one or more embodiments, network 29 is a wireless network, such as a Wi-Fi network, a cellular network, etc.

Also depicted in FIG. 1, accessible via network 29 are low data, high data, and accessory cores 31, 32, and 33 respectively. These cores manage remote message queues, perform state distribution to intelligent agents, either human or non-human, which are not depicted in the figure, and help deconflict any control input conflicts that may or may not occur during multi-agent operations.

The hardware and/or software elements depicted in computer 10 are not intended to be exhaustive, but rather are representative to highlight essential components required by the present invention. For instance, computer 10 may include alternate memory storage devices such as magnetic cassettes, digital versatile disks (DVDs), Bernoulli cartridges, and the like. These and other variations are intended to be within the spirit and scope of the present invention.

FIG. 2 depicts a subset of components of a theoretical robot. This figure is meant to be illustrative for the purposes of this teaching only, and is not an exhaustive enumeration of robots or components commonly used to build such devices. One skilled in the relevant art will recognize that robots, as electronic or mechatronic devices, will contain electronic, mechanical, or both types of components. For clarity, this figure does not present any purely mechanical components, such as struts, wheels, levers, enclosures, power transfer coupling, grippers, vacuum actuators, bodies, etc. well known to practitioners of the relevant art. This disclosure may be applied to any robot(s) of any type(s) with a non-exhaustive enumeration of humanoid robots, aerial drones, autonomous vehicles, home appliances, office equipment, industrial equipment, etc. This disclosure may be practiced with any type, configuration, or number of robots that contains some of the illustrated elements in FIG. 2. Not all illustrated elements in FIG. 2. are needed for this disclosure, with omissions, substitutes, or additions well known to one skilled in mechatronic or robotic arts.

As shown in FIG. 2, robot 47 includes an on-board computer 51. This computer may be of any type or compute capable hardware, omitted entirely and replaced by another computer within the system, or any combination thereof. This computer may be connected to sensors 52 including but not limited to cameras, accelerometers, load cells, flex sensors, voltage sensors, current sensors, encoders, or any other sensor needed for the robot to represent state of the robot, subsystem, environment, world, or any combination thereof. A radio transceiver 49 may also be present and connected to the robot computer to provide wireless communication between the robot and an operator or external device, may utilize a variety of radio communication protocols, including but not limited to packet-based protocols, connection based protocols, digital protocols, or analog protocols, using any sort of radio modulation, including amplitude modulation and/or frequency modulation, or any combination thereof. The operator, not depicted, may be any form of intelligent agent, including but not limited to another computer system running a program capable of issuing complex commands, a human being, trained non-human animal, etc.

Another component that may be connected to the robot's on-board computer 51 is one or more actuators 55. These actuators can enable the robot to interact with itself, intelligent agents, other robots, or the environment around it, for example to pick up objects, change shape, move the robot, or move tool heads, including but not limited to, brooms, brushes, routers, shovels, jack-hammers, lasers, emitters of various types, or perform any other physical task or combination of tasks. These actuators may be assemblies of mechanical and electrical components, or other components controllable by a computer, including but not limited to, electrical, mechanical, or electromechanical devices such as valves, switches, motors, solenoids, contactors, relays, transistors, or vacuum pumps. One skilled in the relevant art will recognize that implementations may be practiced without one or more of these specific details, or with components of similar capabilities.

Additional components that may or may not be connected to the robot's on-board computer 51 is a positioning system 50, which may or may not contain positioning receivers 54 or dead reckoning sensors 53. A positioning receiver can receive signals that enable determination of the robot's or subassemblies of the robot's position within a margin of error, such as satellite-based systems, cellular-based systems, beacon-based systems, or other mechanisms known to those skilled in the relevant art. Dead reckoning sensors 53 enable the robot to understand its position from other methods, such as inertial measurement, environment modelling, marker detection, or other technique not reliant on radio transmission. One skilled in the relevant art will recognize that implementations may be practiced without one or more of these specific details, or with components of similar capabilities.

An auxiliary interface 48 can be used to provide interlinks with other devices, including but not limited to, component controllers, accessory computers, companion computers, or other computation, communications, manipulation, or sensing devices. One skilled in the relevant art will recognize that implementations may be practiced without this interface, or with interfaces/components of similar capabilities.

Figure 3:
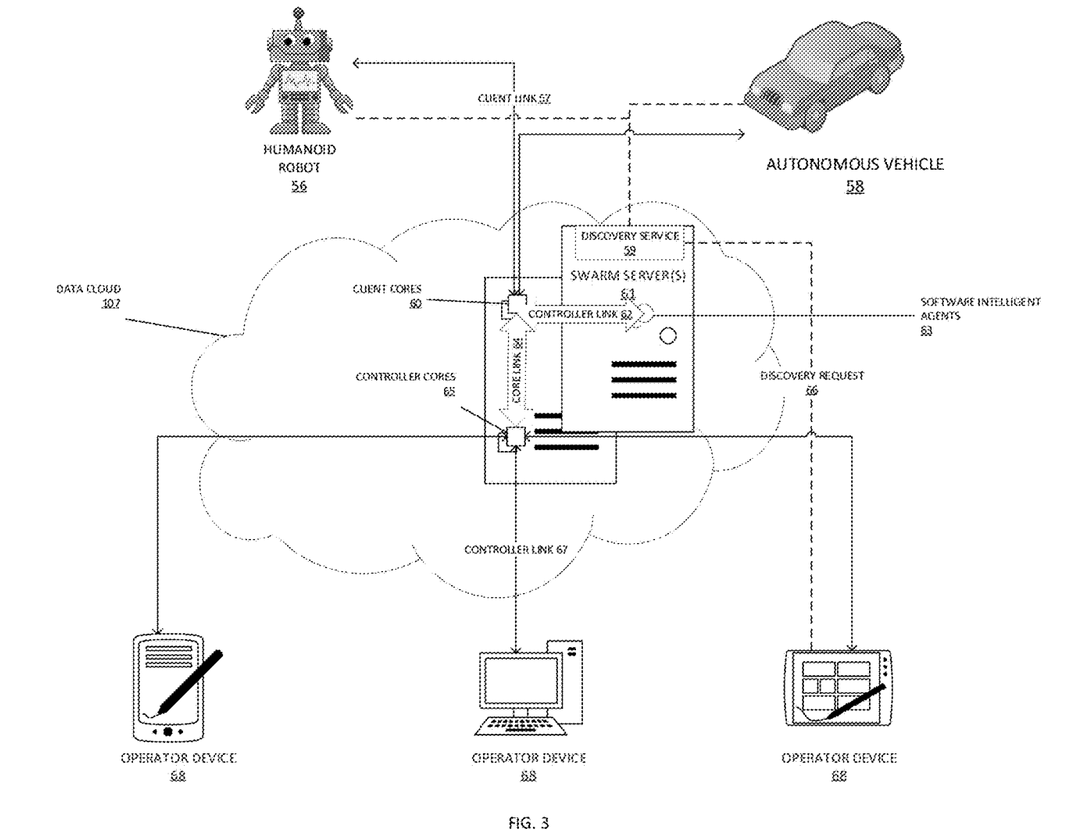
FIG. 3 illustrates data flows within an exemplary swarm system consisting of multiple robots, software agents, and human-operated in accordance with one or more embodiments of the present invention.

FIG. 3 diagrams a simplified overview of an exemplary system, with a swarm of two robots, a humanoid robot 56 and an autonomous vehicle 58, under control of three controller devices 68 and a number of software intelligent agents 63. The controller devices 68 execute a program to interact with a human operator. Neither this user interface program, nor the human operator are depicted in FIG. 3. These controller devices control the robots via messages sent to the controller cores 65 over control links 67. The controller cores 65 simply proxy forward messages to/from the client cores 60 over core links 64 to/from connected controller devices 68. One embodiment has client link 57 and controller link 67 implemented using the WebSocket protocol, however other protocols may be used. Software intelligent agents 63 are also programs, instanced in a cloud computing environment. These agents may be instanced on other computers, including computer 10 depicted in FIG. 1, or on any controller device 68. Software intelligent agents 63 may be practiced with or without an instance of a controller core. In one embodiment, these agents send control messages directly to the client cores. The client cores 60 and controller cores 65 may or may not be the same process instances. In a multi-core embodiment, cores, serving as either client cores 60 or controller cores 65, are instances of the same computer program definition. The discovery service 59 creates core instances of any type by requesting cloud infrastructure load and execute a specified application, stored in one of many possible locations well-known to cloud implementations. Each copy of the core application is identical, though stored in a different location, manner, or retrieved via an appropriate process for the cloud implementation where it is loaded into an active compute system. The LMSO application 23 in FIG. 1, in conjunction with the discovery service 59 in FIG. 3 assigns each client core a mutable role as a low data core 31, high data core 32, or accessory core 33 as depicted in FIG. 1. For the sake of clarity, many components are not depicted in the diagram, including, but not limited to, network communications hardware or protocols, either wired or wireless, cloud virtual containers such as Docker™ or Amazon Web Services Lambda™ instances, human operators utilizing controller devices 68, cloud infrastructure such as load balancers, TCP/IP routers, etc. One skilled in the relevant art will recognize that implementations may be practiced without some of the diagrammed components, with different numbers of diagrammed components such as robots, software intelligent agents, cores of any type, or with additional components well-known to a dynamic cloud runtime environment.

Figure 4:
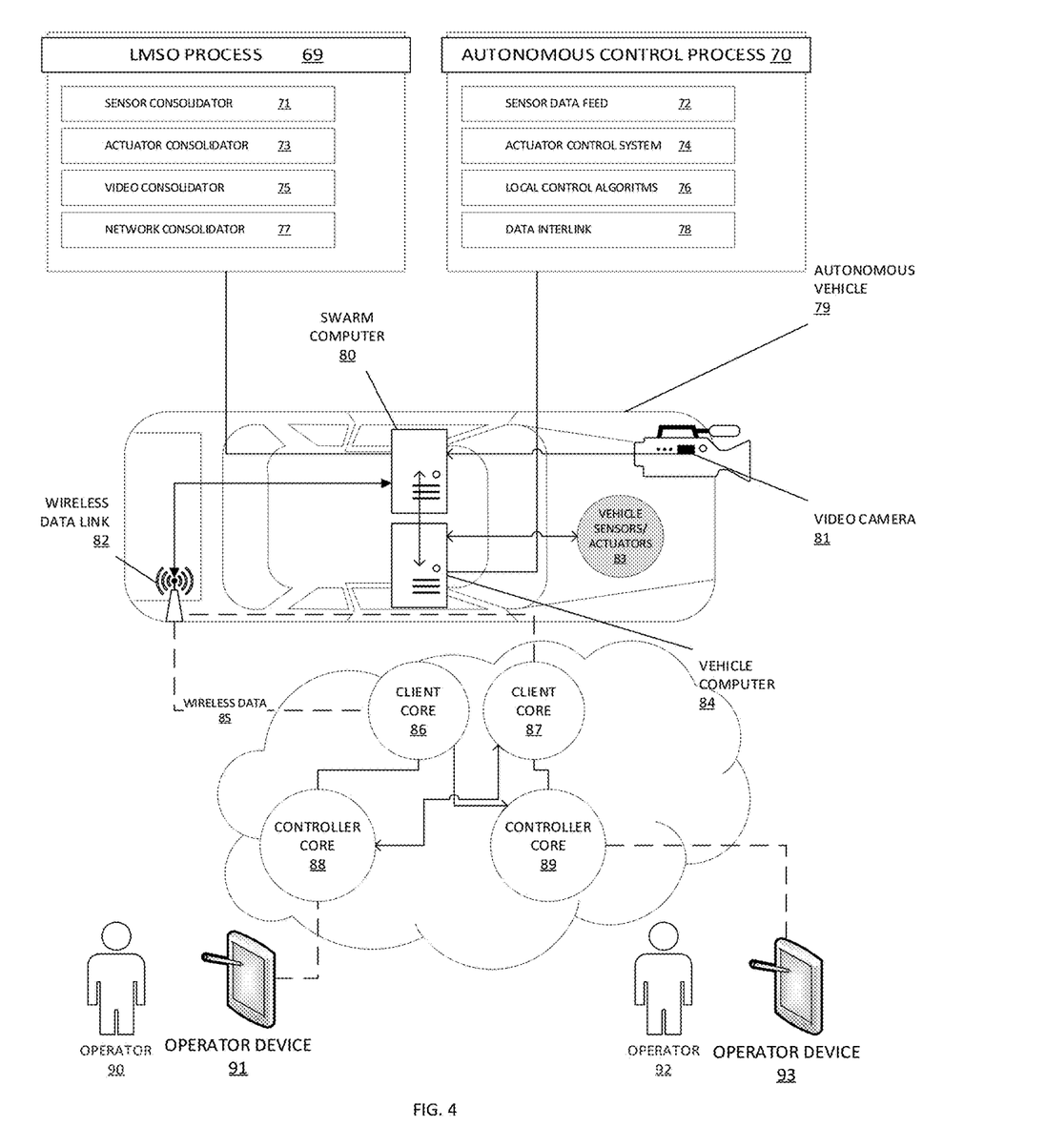
FIG. 4 depicts an autonomous vehicle under control of multiple human operators in accordance with one or more embodiments of the present invention.

FIG. 4 depicts a more detailed example of the system utilizing a single robot, which is an autonomous vehicle 79 in this example, with multiple human operators, 90 and 92. The vehicle is an illustrative instance of the theoretical components shown in FIG. 1 and FIG. 2, with all components present but not diagramed in FIG. 4 to improve readability of FIG. 4. The human operators utilize independent operator devices, 91 and 93, for the purpose of user interaction with the system. All dashed lines depicted in the figure, such as 85, indicate wireless communication links. These links may utilize either packet or connection based wireless network configurations, including but not limited to, Wi-Fi, LoRa®, SigFox®, cellular data, satellite radio links, Bluetooth®, or other wireless protocol. Not all wireless communication links are enumerated in the diagram for the sake of clarity. In this diagram, core processes 86, 87, 88, and 89 are running in cloud instances of some sort. The cloud infrastructure required to execute the core processes are not diagrammed for the sake of clarity. One skilled in the relevant art will understand what components and configurations are required to execute these core programs in a cloud, either public or private, embodiment. Communication interlinks between the cores are diagrammed, but not enumerated, for readability. In one embodiment, these interlinks are provided by WebSocket connection over TCP/IP networks within the cloud provider's infrastructure. These communication links may be implemented via other means, including but not limited to, remote procedure calls over protocols like simple object access protocols (SOAP), bus systems like USB, I2C, SPI, or other methods of remote or inter-process communication. In addition, security enhancements, such as transport layer security, may also be implemented within these interlinks. Also enumerated in this diagram are some tasks that may be performed by the LMSO component 69, originally depicted in FIG. 1, as component 23. FIG. 4 also depicts tasks that may be performed by an autonomous control process 70, most likely implemented as a program executing on the robot's on-board computer 36 in FIG. 1. One skilled in the relevant art will recognize that implementations may be practiced without some of the diagrammed components, with different numbers of diagrammed components, with additional components, including but not limited to, an auxiliary computer, or with substitute components of similar functionality including, but not limited to, field programmable gate arrays, application specific integrated circuits, additional intelligent agents, or any combinations thereof.

The LMSO process 69 diagrammed in FIG. 4 performs many tasks needed to communicate with the relevant cloud core process, as well as gather required state of the robot, and transform data to help control the robot. Such tasks include, but are not limited to, sensor consolidation via the sensor consolidator 71, actuator consolidation via the actuator consolidator 73, video consolidation via the video consolidator 75, and network consolidation via the network consolidator 77. In this context, consolidation of sensors, actuators, video, or network is defined as composing or decomposing data of the appropriate type, placing/receiving the data into a message queue, and transmitting/receiving the message queue with the appropriate core. To illustrate this concept of consolidation, consider the following simplified example of a single sensor from autonomous vehicle 79: one skilled in the art of vehicle operation will understand that vehicles have a control for fuel flow, colloquially known as a "gas pedal". A sensor can be placed in-line to the throttle system to determine the position of the "gas pedal", and as such, would be an example of vehicle sensor 83. One skilled in electrical engineering arts may choose to utilize a throttle sensor that sends information as an analog voltage between zero and logic level, with zero mapped to idle fuel flow, full fuel flow mapped to logic level, and fuel flow levels in between idle and full flow mapped as a linear function given by the formula: V=(current fuel flow rate)/(maximum flow rate)*Vcc. This voltage, V from the aforementioned formula, is then delivered by wired link to vehicle computer 84, and published to the sensor data feed 72 via USB. An application process, such as ROS™ 21 in FIG. 1 or the LMSO process 69 in FIG. 4, executing on swarm computer 80 reads the sensor data feed 72 over USB, and sends the received voltage as a floating-point number to the sensor consolidator 71. The consolidator then normalizes the floating-point number as between 0.000 and 1.000 via this mathematical formula: define F as fuel flow, Vr as voltage received, Vcc as logic level voltage of vehicle computer 84; F=Vr/Vcc. This value of F is then placed in a data structure representing sensor state of all tracked sensors held in the application memory of the LMSO 69. Each consolidator executes in its own thread of execution, but within the same process scope, of the LMSO. A scheduler, not depicted, manages allocating processor time to the threads. The network consolidator 77 then reads/writes these in-memory data structures and transmits/receives the values to core processes 86, 87 via wireless data link 82. This process of updating memory and communicating state between the LMSO 69, the autonomous control process 70, and the cores 86, 87 is termed "consolidation" in the diagram presented in FIG. 4. One skilled in the relevant art will recognize that implementations may be practiced without some of the diagrammed components, with different numbers of diagrammed components, with different connections between components, with different sensors, actuators, network configurations, or with additional components well-known to practitioners of the relevant art.

Also depicted in FIG. 4 is the autonomous control process 70. For the sake of this example, this process is executing on vehicle computer 84, but may be practiced via different means. The control process 70 captures data from vehicle sensors 83, via the sensor data feed 72, makes decisions from that input via local control algorithms 76, issues commands to the vehicle actuators 83, including but not limited to throttle, brakes, gear selection, or steering wheel actuators via the actuator control system 74. The autonomous control process, in this example, is capable of driving the autonomous vehicle from one location to another without the swarm system described in this disclosure, and the swarm system is augmenting the vehicle to provide human operators 90 and 92 as remote safety drivers. These operators are watching a video on devices 91 and 93 captured by video camera 81 via a user interface application not depicted in the figure. The operators may utilize controls in the user interface application to inform local control algorithm 76 to steer the vehicle, apply brakes, increase/decrease throttle, or issue an emergency stop command to vehicle actuators. One skilled in the relevant arts will recognize that implementations may be practiced without some of the diagrammed components, with different numbers of diagrammed components, with different connections between components, with different sensors, actuators, network configurations, user interfaces, operator devices, or with additional components well-known to practitioners of relevant arts.

Figure 5:
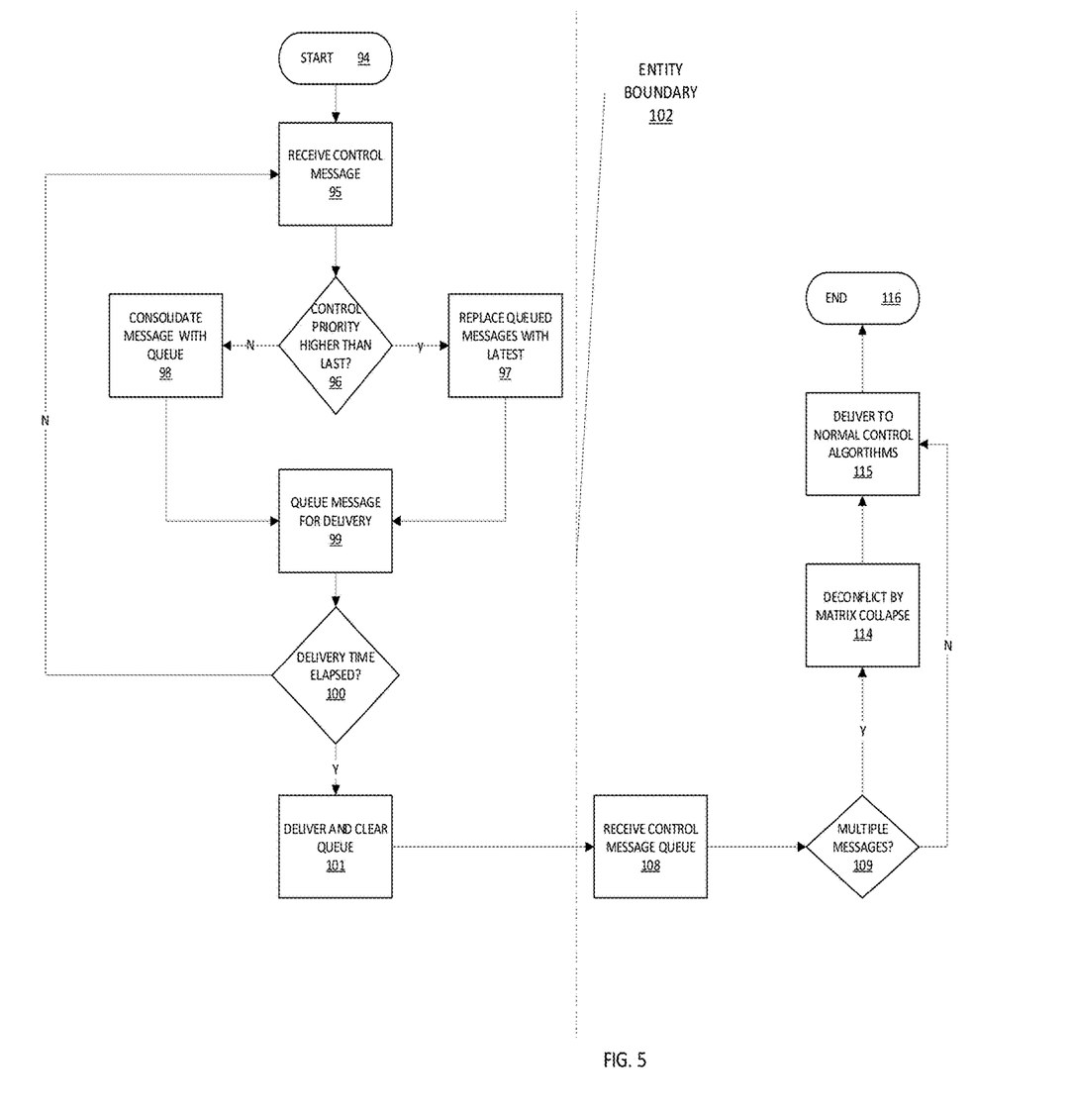
FIG. 5 is a high-level flow chart of one or more steps performed by one or more computing and/or other hardware/software devices to consolidate messages and adjust control input of a robot in accordance with one or more embodiments of the present invention.

FIG. 5 depicts the distributed method used by any core process acting as a low data client core, previously depicted as component 60 in FIG. 3, and the LMSO previously depicted as component 23 in FIG. 1, to resolve multi-agent control conflicts in the swarm. To better understand the innovation, the problem(s) the innovation addresses must first be described in detail. Prior to the innovation, for example in the Robot Operating System, a publication and subscription system exists for robot state messages and control messages. These messages have a unique address, known as a "Topic", which utilizes a naming convention to avoid conflicts, along with a message payload. The application process executing on a computer used to manage the publication/subscription queue is known as a "core". Application processes, called "nodes", communicate with this core via messages, which are complex data types, then sent via inter-process communication methods including but not limited to, named pipes, loopback network addresses, or TCP/IP transport to a core process executing on either a local or remote computer. A simple illustrative example of this publication/subscription concept may be the publication/subscription of a single temperature sensor. In this example, a sensor on the robot reads a sensor that reports temperature in degrees Fahrenheit at a contact point on the sensor. A core process may create a topic following the naming convention, such as, "/Robot/Sensors/Temperature" which can receive publication messages from nodes, also running as independent application programs, then push the received message to other nodes that have subscribed to this topic. The core itself must have a static path, such as local process name, or remote TCP/IP address, that does not change once a node starts operation. The pre-existing system creates the following problems: (1) cores cannot be dynamically allocated or destroyed because each node knows of only one core via a static path; (2) multiple cores are not permitted, as subscriber nodes would not know which core contains the message queue with relevant messages; (3) message cores must remain running even when no nodes are publishing or subscribed to messages in order to be available to any node that may have messages in the future, thus increasing compute costs in a cloud deployment; and (4) messages sent to the same topic may conflict, and must be deconflicted. The disclosed innovation solves the four pre-existing problems.

The first, second, and third problems are solved via the discovery service, which is depicted as component 59 in FIG. 3. In one embodiment, this service is a Representational state transfer (REST) microservice, and the LMSO 23 component of a robot depicted in FIG. 1, here referred to as "robot" or "robots", as well as any agent applications, here referred to as "controller" or "controllers", communicate with this discovery service to find the location of appropriate cores to communicate with a specific robot. The discovery service, LMSO, and controller applications implement the following features: (1) each robot, core, and controller has a single, globally unique name that is communicated over REST to this microservice and present in all messages; (2) each robot, core, and controller announces their own name and IP address at startup to the microservice; (3) the microservice maintains a map of name and type to IP address for each robot, core, and/or controller as well as an inverse map of IP addresses to names and types; (4) any entity may make a request for the IP address of any entity by name and/or entity type, either robot, controller, or core, to the discovery service; (5) all robots, cores, and controllers must maintain a persistent and local cache of requested names; (6) both controllers and robots may request a core without specifying a name, which causes the discovery service to instantiate a new core in the cloud infrastructure and return the new instance name and IP to the robots or controllers; (7) a robot, core, or controller may request its own identity information via its own IP address; (8) in the case of a name collision, it is presumed that the newest entity with the name is the entity in question; and (9) cores destroy themselves if there are two minutes of no message activity, and inform the discovery service of their self-destruction. These nine enumerated features enable any robot, controller, or core to be dynamically created, destroyed, or reassigned in the communication graph depicted in FIG. 3. These REST calls are enumerated as the discovery request component 66 in FIG. 3, and graphed as dashed lines.

The fourth aforementioned problem, that is messages sent to the same topic may conflict, requires some further explanation. In a single robot control system, where a single operator works with a single robot, there is little chance of intentional control input collision. In the autonomous vehicle example depicted in FIG. 4, if there is only one operator with one operator device instead of two operators with two devices, then operator input conflict is not possible. If, for example, an obstacle was to suddenly appear on the road in front of the vehicle, a single operator may input a "hard left" command to the system. In the case of two operators, it is possible for one operator to indicate, "hard left", and the other to indicate, "hard right" to avoid the obstacle. Both "hard left" and "hard right" messages from different operators would be sent to the same topic for the same robot, both messages would be intentionally sent for operating the robot, and the two messages would cause a message conflict. In the single operator case, the vehicle would follow the input of the single operator and avoid the obstacle. In the multiple operator case, the correct method of deconfliction becomes difficult to ascertain—one might utilize time based deconfliction, such as "first control input wins", might utilize a prioritization system, for example, operator 92 always has priority over operator 90, as depicted in FIG. 4, or might average the inputs either with or without weights, etc. In addition, the autonomous vehicle may itself determine a course of action to avoid the obstacle, or an intelligent software agent running in a cloud embodiment may determine a course of action. Only some of those methods of deconfliction would be effective for the specific use case. The example of conflicting control inputs to an autonomous vehicle is only meant as a teaching example for the general case problem of input collision. One skilled in the relevant art would be able to find other examples and use cases, and it would not be obvious to one skilled in the relevant art how to systematically solve the control input conflict problem for different use cases.

FIG. 5 diagrams a general case method to solve for the message collision problem, and proscribes a few constraints on messages in order to resolve the problem. These constraints can be described as follows: (1) messages are composite structures in a specific logical abstraction hierarchy; (2) messages include two timestamps, one describing when the message was generated on the origination system, and one describing when a core process dispatched the message to a receiver; (3) all network-connected devices utilize a time synchronization service such as the network time protocol (NTP); (5) all timestamps are presented in coordinated universal time (UTC); (6) control messages contain a thirty-two bit unsigned integer priority field; (7) control messages contain an array of floating point numbers, either single or double precision, representing control state starting at index 2 in the array, with indices 0, 1 used for origin classification and exception/emergency/override prioritization respectively; (8) all controls that can be represented by a gamepad, either physical or virtual, are encoded into a control message and have a domain between −1.0 and 1.0, inclusively, with each individual axis of control having a single index in the control array, including but not limited to controls representing virtual joysticks, sliders, buttons, analog triggers, or potentiometers; and (9) all position-based control messages, including but not limited to latitude, longitude, elevation, or local distance in any dimension of space or time from origin as either a cartesian map coordinate or a quaternion, are transformed via tuple, vector, or matrix reshaping to enable representation in a one-dimensional control array. In addition to the constraints on control input, the method described in FIG. 5 depends upon a specific hierarchy of composited messages, which can be described via levels of structural abstraction.

The highest level of structural message abstraction is an action message. This message is defined as containing three fields, which may or may not be composite structures as follows: (1) an action type that may have values of identify, publish, subscribe, unsubscribe, request, or response; (2) an identity structure that contains the originators globally unique name and the IP address of the sender as known to the sender itself. This is to enable proper message delivery in the case of firewalls or other address translating proxies commonly used in network topologies; (3) a payload that is a composite message of the next layer of abstraction; and (4) a field as a Boolean indicating that control information is present in the message.

The next, more specific, layer of abstraction beneath the action message is the payload message. Payload message is defined as containing the following two fields, which may or may not be/contain composite structures: (1) message meta data which includes information including the globally unique name of the sender, a topic string which contains a target name as the first element, delineated by the "/" character, for the core to use in creating maps of messages for delivery, a created time as a POSIX UTC time, a delivered time which is also a POSIX UTC time, a Boolean field indicating the message has been dispatched to a receiver, and an exclusion list indicating which other devices should not be given the message; and (2) a serialized byte array indicating the payload message, which must implement a "Serializable" interface containing a "ToBytes" member function that returns a byte array, and a "FromBytes" member function that can take a byte array and return a message of the original data type.

The next, more specific, layer of abstraction is the "control position" message. This message is defined as a composite message that implements the "Serializable" interface, containing the following fields: (1) a control message that is a composite message containing (A) an array of control inputs for the robot, with index 0 indicating origination information of the message, with a value of 0.0 indicating the message originated on the robot itself, and 1.0 indicating the message originated in another location, and index 1 indicating if this message is normal operations with a value of 0.0 indicating normal operation and a value of 1.0 indicating exception, emergency, or override operation conditions. Indices greater than or equal to 2 indicate a specific control, with allowed values for input-based controls, including but not limited to joystick axes, analog buttons, analog triggers, or other control that may return a per index between −1.0 and 1.0, inclusively, with other control information, such as global position system waypoints, transformed by reshaping to fit within an array; and (B) a priority field, which is a 32-bit unsigned integer between 0 and 4,294,967,295. Values between 0 and 99, inclusively, indicate control inputs generated by either human or non-human mechanisms, and values greater than or equal to 100 exclusively indicate human operators. Non-human actors are given a priority by configuration stored in a configuration file, with most given the priority of 0. However, one skilled in the relevant art may choose to assign higher priorities to certain agents, and may do so either by configuration, or via the discovery service; and (2) a position field that represents absolute position on earth or space of the agent originating the message as latitude, longitude, and elevation in standard geographic information systems (GIS) format. A position of 0.0, 0.0, 0.0 is assigned by default, and is used by agents that do not have a mechanism to determine where on earth these agents are located. While this structural example presupposes that the message format is implemented in an object-oriented programming language for the sake of clarity, one skilled in the relevant art of computer programming will understand how to convert this specification to programming languages of other types, and such transformations are still considered within the spirit and scope of this disclosure.

The mechanism of operation of these messages by controllers, including controllers within the robot itself, is to create these messages via reading some input values, running a mapping algorithm, and generating a "control position" message, then serializing the "control position" message and placing the resultant byte stream into the byte array of a payload message, and setting the payload message meta data in the structure. After the payload message structure is filled, the payload message is composited into an action message, usually of the type "Publish", with the Boolean indicating that control information is present set to true. This action message is then sent, via various mechanisms, to the low data core, first referred to as element 31 in FIG. 1.

The low data core 31 in FIG. 1 is a core, typically instanced on cloud infrastructure, that has multiple functions, including handling client requests for information from the core itself about clients and/or controllers, or managing a message queue. This core is not allowed to manage messages that may be large or difficult to process, such as video messages. This is to enable the core to operate quickly, thus minimizing latency by the robot. Only control information, and/or critical sensor information needed by operators, either humans or intelligent agents, are allowed by convention to flow through the low data core. The discovery process, previously described, ensures that every robot has exactly 1 low data core at all times. If this core should terminate, another will be assigned when the LMSO 23 in FIG. 1 restarts core discovery. In one embodiment, the accessory computer, 38 in FIG. 1, monitors both the LMSO 23 and the robot's on-board computer 36, and allows the robot to operate without the LMSO 23, or assigned low-data core 31, for no more than 2 seconds. After 2 seconds of operation without the LMSO 23 process or without connection to a low data core 31, the accessory computer will direct the robot's on-board computer to safely halt operations. One skilled in the relevant art will recognize that implementations may be practiced without some of the mentioned components, with different numbers of components, different timeouts, with substitute components of similar functionality including, but not limited to, field programmable gate arrays, application specific integrated circuits, additional intelligent agents, or any combinations thereof. While the role of the low data core 31 may be practiced via alternate means, some part of the system must maintain a queue of control messages. Whichever component of the system is performing this function will be functionally equivalent to the low data core.

The low data core performs message consolidation of control messages via the method enumerated in FIG. 5. A non-terminating loop is continuously running in the core, indicated by step 94 in FIG. 5. When an action message is received by this core and its control presence Boolean is set to true, step 95 of FIG. 5 is satisfied, and the "control position" message is unpacked from the message structure. The priority field of the "control position" message is then analyzed, and if greater than any message in the control queue, the control queue is flushed and the message repacked and placed in the control queue as indicated in step 97. If the priority is lower than the other messages, the incoming message is simply dropped. If the message priority is equal to the other messages in the queue, then consolidation, step 98 is performed. Consolidation, step 98, is performed as follows: (1) consolidation is pair-wise with the next most recent message in the queue; (2) the control data indicating message origin, in position 0 of the control array, is checked. Whichever message has a larger number in this field wins, and becomes the only message placed in the queue and consolidation ends except if index 1 is set to a value of 1.0 for the smaller message, in which case, the smaller message remains in the queue and may still win in the next condition; (3) position 1 in the control array is checked for all control messages. As before, the larger number wins with the corresponding message placed in the queue and ending consolidation; (4) if both messages have the same values in control array positions 0 and 1, then the message is placed in the queue for delivery to the LMSO process of a robot, ending core consolidation step 98. In either case, at least one message is now in a delivery queue 99. A timer checks the queue every few milliseconds, and if sufficient time has elapsed, delivers messages to connected subscribers and clears the queue, finishing the core's role in message delivery, as indicated by entity boundary 102. Further deconfliction is performed within the LMSO of a robot.

The LMSO takes delivery of the message queue, satisfying step 108 in FIG. 5, and beginning the LMSO's process of further deconfliction. When the LMSO receives multiple "control position" messages in step 109, it knows that further deconfliction is required and advances to step 114, otherwise the single message is delivered for normal operations as described in step 115. In step 114, The following actions are performed with the conflicting messages: (1) the first two elements of the control array for each message are discarded, as they have already been used by the low data core and are not used by the LMSO; (2) a weight matrix, W, is dynamically created. The size of the matrix has as many rows as the length of the reduced control array of the message with the longest control array, and as many columns as the number of messages received. All weights in the matrix are then set to 1.0; (3) an algorithm sets these weights to values other than 1.0, one element at a time, based on configuration data loaded from a configuration file, configuration system, or other method of configuration; (4) the configuration can state an algorithm weight per element based on the factors of time, location, or statically via a stored matrix, or can request dynamic creation of the weight matrix; (5) the control arrays from all conflicting messages are placed into a control matrix C, with each message's control array represented by a single column vector; (6) a new matrix, WC, is created by elementwise multiplication of the two matrices W and C; (7) matrix WC and matrix W are both collapsed into column vectors by horizontal summation, with vector "Vwc" representing the composite matrix WC, and vector "Vw" representing the weight matrix W after collapse; (8) final control vector is generated either by element wise dividing Vwc by Vw, or by threshold value trigger mapping per element (that is, if the value of that element exceeds some pre-defined number, it is mapped to either 1.0 or 0.0); and (9) this vector is passed to the control algorithm as if it was generated by a single operator.

The dynamic weight matrix creation method of element (4) in the enumerated list in the aforementioned paragraph is as follows: (1) For each element, choose either time, location, or row index as the factor. Only one factor is allowed per row to generate a factor matrix, F; (2) each factor in matrix F is fed to one of three functions to generate a corresponding row vector for weight matrix W, and each function returns a row vector equal in element count to the number of factors inserted. The three functions are Min(F) which returns a row vector with the smallest element from the corresponding input control vector row having value 1.0 and all other elements having value 0.0, Max(F) which returns a row vector with the largest corresponding element having value 1.0 and all other elements are 0.0, or LM(F) which is linear matrix function with each element having a linear equation of the form $Wr=C+MXr$ where C, M are constants pre-specified in configuration for that control index, and Wr is that row vector in the weight matrix W, and Xr is the corresponding control row vector.

Once the factor matrix is generated, a weight matrix is derived from the factor matrix, then a single control vector is derived from the weight control matrix, with the control vector converted to a control array and sent to the control algorithms as if a single operator had generated the inputs. This control array is then sent to the robot's control methods to use as input in the robot's motion plan as per step 115. This completes deconfliction as indicated in step 116.

Now that the method is described in FIG. 5, the previous mentioned example of multiple operators inputting "hard left" and "hard right" to avert a collision for the autonomous vehicle depicted in FIG. 4 can be revisited, with this method applied to solve the control conflict. A slider, an emergency button, and a virtual joystick can be added to the user interface application running on devices 91 and 93. The virtual joystick maps "hard left" to a value of −1.0, and "hard right" to a value of 1.0, with this joystick value stored in control index 2 of all control messages. The slider indicates and adjusts the control message priority with the operator, and the emergency button sets an emergency flag in control index 1 to value 1.0 for messages generated by that device. The user application may create a request action message to the low data core, and request priority information for all control publishers registered to that core. The core will respond with a dictionary or similar data structure, indicating globally unique name of each control publisher, and that publisher's last control message priority. The user interface applications can thus detect a priority collision between operators, color the slider red, and allow the human operators to adjust message priority until the collision is resolved. In the alternative, if the human operators do not adjust the priority slider, the system configuration in the LMSO can be set to use the Max(F) factor weight function for deconfliction. This will result in a vehicle that always chooses the most "right" input, that is the largest value of the control input, it receives when conflict occurs. If both operators chose "hard right", the weight matrix elements would then be linearly averaged via matrix multiplication and collapse within the LMSO. This would create an average input, with value 1.0 for that element in the control array, which would also cause the vehicle to act as if a single operator had inputted, "hard right". If the autonomous vehicle itself had chosen to initiate a move action via a "control position" message, the control information at index 0 of the control array would have a value of 0.0 from the vehicle, and 1.0 from the human operators, and the human operator's decisions would take priority. If the vehicle had detected the obstacle and set control index 1 of the control array to 1.0, then assuming the humans did not set the emergency flag via the user interface, the vehicle would win the conflict, and choose its own action. If any or both human operators noticed the obstacle and chose to input an avoidance direction while pushing the emergency button in the user interface, then deconfliction would still occur as under the normal driving cases, but the human emergency actions would win over emergency actions chosen by the vehicle itself. This example is purely for teaching, and is not meant to indicate the solution is applicable only to autonomous vehicles; and one skilled in the relevant art would be able to apply the method to many scenarios where control conflict by multiple operators is present.

Another possible example of deconfliction can be expounded upon via the diagram in FIG. 3. In this use case, three human operators, not depicted, each using one of the operator devices 68, along with multiple software intelligent agents 63 are acting to load small boxes, not depicted, into the trunk of autonomous vehicle 58. The control array that will be placed into a control position message can now be defined as such: indices 2, 3, 4 are the position of the right hand in space relative to the center of mass of robot 56 in decimal millimeters in a cartesian coordinate system; similarly, indices 5, 6, 7 are the position of the left hand in decimal millimeters; similarly indices 8, 9, 10 are the position of the right foot relative to robot center, and indices 11, 12, and 13 are for the left foot; indices 14, 15 are latitude and longitude in decimal degrees with double precision indicating the precise location of the car's trunk, indices 16, 17, 18, and 19 comprise a quaternion indicating the cars rotation in space around the GPS location of the trunk such that the front center of the vehicle can be identified in relation to the GPS location; indices 20, and 21 represent a target latitude and longitude location for the vehicle to autonomously drive to, with tuple value (0, 0) for these indices indicating no motion; indices 22 and 23 represent a latitude and longitude target for the robot to move to, with a tuple value of (0, 0) indicating no motion; index 24 is an emergency stop flag that instructs each robot to safely halt operations when the value is set to 1.0. Each robot has its own independent low data core and high data core instanced in cloud infrastructure, represented as client cores 60. The low data core for each robot is only used for control messages, while all sensor and video data from the robots utilize the high data core. Each human operator has a dynamically allocated core acting as control position message forwarder to minimize latency, depicted as controller cores 65. These controller cores communicate over high speed links to client cores via controller link 64, and software intelligent agents 63, directly communicate with appropriate client cores via controller link 62. The three humans have the following roles that they have been assigned to: one human enters latitude and longitude coordinates for the robot to move to, one human enters GPS location of the trunk and car orientation quaternion, and one human is responsible for issuing an emergency stop action via a button in the user interface of the device (s)he is using. Software intelligent agents assist the humanoid robot in avoiding obstacles for the hands and feet, with one agent per limb of the humanoid robot. All agents use the same control message format, but only fill non-zero values in the indices they normally work with. All agents are subscribed to the video and sensor data messages sent via the high data cores for both robots. All agents broadcast a control message every 10 milliseconds, with the low data cores per robot consolidating and delivering messages every 100 milliseconds. A configuration is entered onto both robots to use the Max(F) factor function and matrix collapse method if conflicting messages arrive. All agents are assigned the same control position message priority of 0.0, and the exception flag is also set to 0.0, thus all message deconfliction will occur on each robot. When the robots each receive their message queue from their respective low data cores, each will receive 10 control-position messages from each of the 7 previously described agents. Each message will have 24 elements in the control array. The robots will create a control matrix via the matrix deconfliction method previously described, creating a control matrix of 22 rows and 70 columns. A weight matrix will be generated, using an elementwise factor matrix and the Max(F) method. Matrix multiplication, follow by horizontal collapse will occur as previously described, resulting in a final control vector of 22 elements, whose elements are all the maximum generated by any control agent. This vector will be converted back into a control array, and the robots will generate and execute motion plans accordingly.

Both the aforementioned examples are dynamic, that is agents acting as controllers, robots, or cores may be added or removed to the scenario at any time. As an illustrative example, one human operator providing control inputs for the autonomous vehicle in either example may choose to exit the control stack of the system at any time. Both examples will continue to function with this human removed, though the system may have diminished capability. If all agents exit the control stack of an active robot or robots, the control cores will not receive messages and shut down. Should the control cores shut down, the LMSO will detect no messages for two seconds, and it will begin a discovery process of seeking an active core. While the robot is searching for an active control core, the accessory computer will detect a lack of control messages from the swarm computer, thus requesting the robot perform a "safe stop" action via the robot's on-board computer. Thus, the robot will be safely stopped in some location and awaiting an operator, either human or software intelligent agent, to utilize the stopped robot as needed.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of encoding and deconflicting control information to adjust operations of robotic systems that enables one or more operators be dynamically assigned, the computer-implemented method comprising:
    configuring a discovery system operatively associating one or more cloud cores, one or more controllers, and a plurality of robots;
    providing a hierarchal message format system comprising at least three layers of message composition;
    encoding for message generation time, message dispatch time, message origin, sender global position, operating state of either normal or exception, and control inputs;
    distributing message delivery and partial deconfliction between the one or more controllers, the plurality of cloud cores, in either public or private cloud infrastructure, and on-robot computers over a network;
    resolving on-robot conflicts for control inputs generated by the one or more controllers not already deconflicted in each cloud core; and
    stopping a robot of the plurality of robots if no control inputs are received for said robot after a timeout interval.

2. The method of claim 1, further comprising:
    discovering the plurality of robot, the plurality of core(s), and/or controllers(s) via Representational State Transfer (REST) application programming interfaces (APIs), wherein said APIs implement routes to perform functions comprising:
        (1) a route for storing identification information including globally unique name and/or IP address of a robot, core, or controller process by name, type, and/or IP address;
        (2) a route for remote message queue/core allocation and enabling access via network communication;
        (3) a route for enabling a robot, core, or controller process to request identity, IP, and/or geographic location of any other robot, core, or controller;
        (4) a route for querying previously stored name information by IP address, either inferred by an HTTP or HTTPS request, or directly supplied as a parameter;
        (5) a route to destroy and disconnect cloud infrastructure used to manage message queues also known as core(s); and
        (6) a route to assign priority of a specific controller.

3. The method of claim 1, wherein the hierarchal message format system comprises:
    a first message format used to specify actions, called an action message comprising action types of identify, subscribe, unsubscribe, publish, request, or response; and
    a second message format comprising fields for storing/accessing message action type, the globally unique name of the message sender, a Boolean indicator that control information is present in the composited payload message; and
    a payload message type that comprises:
        (1) message meta data which includes information including the globally unique name of the sender, a topic string for the core to use in creating maps of messages for delivery, a creation time as a Portable Operating System Interface Coordinated Universal Time (POSIX UTC) time, a delivery time which is also a POSIX UTC time, a Boolean field indicating the message has been dispatched to a receiver, and an exclusion list indicating which devices should not be given the message; and
        (2) a serialized byte array indicating the payload of the message;
    a message requirement exportable via the serialized byte array of a payload message that such messages must implement a "Serializable" interface containing a "ToBytes" function that returns a byte array, and a "From Bytes" function that take a byte array and return a message of the original data type, or other similar transformation defined by programming language specifications for communicating required conversions;
    a control position message configured to implement the "Serializable" interface to enable transport within a payload message, comprising:
        (1) an array of floating-point, either single or double precision, control inputs for a robot, with index 0 of the array indicating origination information of the message, with a value of 0.0 indicating the message originated on the robot itself, and 1.0 indicating the message originated in another location, and index 1 of the array indicating if this message is normal operations with a value of 0.0 indicating normal operation and a value of 1.0 indicating exception operation conditions, wherein all other elements of the array indicate control input for a robot;
        (2) a priority field, which is a 32-bit unsigned integer between 0 and 4,294,967,295 with values between 0 and 99, inclusively, indicate control inputs generated by either human or non-human mechanisms, and values greater than or equal to 100 exclusively indicate human operators; and
        (3) a position field or fields indicating the latitude, longitude, and elevation of the message generator with this field having a latitude, longitude, and elevation of 0.0, 0.0, and 0.0 when position is not ascertainable or estimable.

4. The method of claim 3, further comprising:
    distributing robot state information or control information via a network-connected core with or without partial control message deconfliction, as follows:
        (1) the queue receives action messages as specified in claim 3;
        (2) the queue responds to publish action messages by adding the message for delivery by utilizing the topic information contained within the message;
        (3) the core responds to subscribe messages by storing a list of recipients for each topic;
        (4) the core may respond to identity messages by returning the name of the caller by IP address;
        (5) the core may respond to request actions by examining the payload of the message for parameters, performing an algorithm utilizing those parameters, then issuing a "response" action message with the output of the requested algorithm;
        (6) the core may detect the presence of control messages via a control presence Boolean, and performs queue deconfliction action via comparison of the new message with the most recent action message with a "true" control present Boolean value already in the appropriate publishing queue; and (7) publishing messages from the queue to subscribed targets on a regular time interval.

5. The method of claim 4 further comprising:
providing mechanism for core control deconfliction utilizing the control array received in an action message such the following conditions are met:
(1) normal off-robot operator control information takes priority over normal robot self-generated inputs;
(2) exception on-robot control inputs take priority over normal off-robot control inputs; and
(3) exception off-robot control inputs take priority over exception on-robot control inputs.

6. The method of claim 1 further comprising:
distributing network-connected message delivery infrastructure such that at least the following conditions are satisfied:
(1) all robots must have exactly one "low data" core dedicated to control inputs such that these low data cores are not allowed large messages, that is messages with more than 10 kilobytes of payload information; and
(2) control message queue deconfliction over a time interval is performed in this "low data" core prior to control queue delivery to a robot or other subscriber.

7. The method of claim 1 further comprising:
mechanism for multiple control input collapse into a single control input array via the following matrix transformations:
(1) the first two elements of each control input array received via messages are dropped;
(2) each control array is converted into a column vector;
(3) any column vector elements not present in column vectors with shorter lengths than the longest have an element value of 0.0;
(4) each control column vector is concatenated, in any order, into a control matrix with final matrix size equal to the number of conflicting messages received by the length of the longest column vector;
(5) the generation of a weight matrix, such that the size of the weight matrix is equal to the size of the control matrix, with every weight element set to an initial condition of 1.0;
(6) the computation of new weights by row, via functions utilizing control matrix row vectors as input and outputting a row vector to replace the corresponding row vector in the weight matrix;
(7) matrix multiplication of the weight matrix with the control matrix to generate a weighted control matrix;
(8) horizontal collapse of both the weighted control matrix and weight matrix via row summation to two independent column vectors;
(9) elementwise division of the weighted control column vector by the weight column vector; and
(10) conversion of the resultant column vector back to an input array appropriate to the robot.

8. The method of claim 7 further comprising:
generating message generation time, message receipt time, message origination location, or linear transformation via factor conversion as follows:
(1) only one factor transformation may be performed per row vector of the weight matrix;
(2) allowed factor functions may use the corresponding control matrix row as input;
(3) the factor function returns a row vector, which replaces the row vector of the weight matrix via corresponding row index;
(4) the factor functions may be a 1-hot style minimization or maximization function, such that the value 1.0 is returned for the element with either the minimal or maximal value of the control row vector, with all other elements being 0.0; and
(5) the factor functions may be a simple linear transformation of the form $y=mx+b$, where y is the output weight element, m is a constant specified via configuration, x is the corresponding control element, and b is a constant specified via configuration wherein this same function may be performed with the row vectors directly, in which case, the corresponding formula would be $Y=MX+B$, where Y, M, X, and B are corresponding row vectors, and all operations are performed element-wise.

9. A system, either real, virtual, or both, using the method in claim 1 with the capabilities of encoding and deconflicting control information to adjust operations of robotic systems that enables one or more operators be dynamically assigned, the system comprising:
a discovery system operatively associating one or more cloud cores, one or more controllers, and a plurality of robots;
a hierarchal message format system comprising at least three layers of message composition;
a computer program product for message generation time, message dispatch time, message origin, sender global position, operating state of either normal or exception, and control inputs;
a mechanism configured for distributing message delivery and partial deconfliction between the one or more controllers, the plurality of cloud cores, in either public or private cloud infrastructure, and on-robot computers over a network;
a mechanism configured for resolving on-robot conflicts for control inputs generated by the one or more controllers not already deconflicted in each cloud core; and
a mechanism configured for stopping a robot of the plurality of robots if no control inputs are received for said robot after a timeout interval.

* * * * *